(12) United States Patent
Mori et al.

(10) Patent No.: US 6,467,831 B2
(45) Date of Patent: Oct. 22, 2002

(54) BUMPER APPARATUS FOR VEHICLE

(75) Inventors: Kazuo Mori, Kariya; Tsuyoshi Kamiya; Shinichi Haneda, both of Anjo; Terutsugu Gotanda, Kariya; Kazunari Azuchi, Himi; Kiyoichi Kita; Kazunobu Nuno, both of Toyota, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/940,647

(22) Filed: Aug. 29, 2001

(65) Prior Publication Data

US 2002/0033610 A1 Mar. 21, 2002

(30) Foreign Application Priority Data

Aug. 29, 2000 (JP) .................................... 2000-258976

(51) Int. Cl.[7] .............................................. B60R 14/24
(52) U.S. Cl. ...................... 296/102; 293/120; 293/132; 293/154
(58) Field of Search .............................. 293/102, 120, 293/121, 122, 132, 133, 154, 155

(56) References Cited

U.S. PATENT DOCUMENTS 5,785,367 A    7/1998   Baumann et al.
6,349,521 B1 * 2/2001   McKeon et al. ......... 293/102 X
6,318,775 B1 * 11/2001  Heatherington et al. .... 293/120

FOREIGN PATENT DOCUMENTS

| DE | 195 11 868 A1 | 10/1998 |
| EP | 0 502 648 A1 | 9/1992 |
| EP | 0 870 649 A2 | 10/1998 |
| JP | 5-178144 A | 7/1993 |
| JP | 6-211090 A | 8/1994 |

* cited by examiner

*Primary Examiner*—Joseph D. Pape
(74) *Attorney, Agent, or Firm*—Burns, Doane, Swecker & Mathis, LLP

(57) ABSTRACT

A bumper apparatus for a vehicle includes a first reinforcement, and a second reinforcement extending in the vehicle width-wise direction. The second reinforcement has a first outer wall at a side remote relative to the vehicle body, an inner wall at a near side relative to the vehicle body, and a first top wall and a first bottom wall connecting the first outer wall with the inner wall. The second reinforcement further includes two end portions and an intermediate portion located between the end portions, with both end portions being fixed to the vehicle body via the first reinforcement. At least a portion of the inner wall disposed in the intermediate portion being caved in to gradually approach toward the first outer wall from the both end portions.

14 Claims, 4 Drawing Sheets

BUMPER APPARATUS FOR VEHICLE

This application is based on and claims priority under 35 U.S.C. §119 with respect to Japanese Patent Application No. 2000-258976 filed on Aug. 29, 2000, the entire content of which is incorporated herein by reference.

FIELD OF THE INVENTION

The present invention is generally directed to vehicle bumpers. More particularly, the present invention pertains to a bumper apparatus provided on at least one of the front and rear ends of a vehicle.

BACKGROUND OF THE INVENTION

A known bumper apparatus for absorbing an impact to a passenger and a vehicle body incurred in a vehicle collision is disclosed in a Japanese Patent Application Publication published on Jul. 20, 1993 as Toku-Kai-Hei 5(1993)-178144. This known bumper apparatus is disposed on side members on both sides near either the front or rear end of the vehicle body, and the opposite ends thereof are attached to the side members. The bumper reinforcement extends in the vehicle width-wise direction of the vehicle body and has a uniform cross-section in the span thereof. An absorber and a bumper cover are overlaid on the outer surface of the bumper reinforcement in a direction applied with an impact load incurred during the vehicle collision.

The bumper reinforcement, as a main member of the bumper apparatus, is formed by a hollow member that is generally defined by outer and inner walls, top and bottom walls, and a center wall between the top and bottom walls. The bumper reinforcement absorbs an impact incurred upon vehicle collision by plastic deformation of each portion such as the middle or both ends thereof, thereby preventing damage to the vehicle body.

A bumper reinforcement including a more effective mechanism for preventing damage to the vehicle body upon vehicle collision is proposed in a Japanese Patent Application Publication published on Aug. 2, 1994 as Toku-Kai-Hei 6(1994)-211090. This bumper reinforcement also has a uniform cross-section across the span thereof, but has attachments to the side members that are weakened by providing a hole thereon.

A bumper reinforcement having the uniform cross-section is unsuitable for a bumper apparatus that is to be fitted in a complex curve of the vehicle body. A bumper reinforcement with such uniform cross-section also cannot have a sufficient thickness of the absorber disposed between the bumper reinforcement and the bumper cover.

Accordingly, the known bumper apparatus is unable to absorb the impact of a vehicle collision by the bumper reinforcement alone, and so the bumper apparatus needs to have additional members to reinforce the side members. Therefore the number of parts forming the bumper apparatus is increased, and the structure of the vehicle body including the side members and the additional members becomes complicated.

Accordingly, a need exists for a bumper apparatus having an improved ability to absorb the impact resulting from a vehicle collision.

SUMMARY OF THE INVENTION

In accordance with one aspect of the invention, a bumper apparatus for a vehicle includes a first reinforcement, and a second reinforcement extending in the vehicle width-wise direction. The second reinforcement has a first outer wall at a side remote relative to the vehicle body, an inner wall at a near side relative to the vehicle body, and a first top wall and a first bottom wall connecting the first outer wall with the inner wall. The second reinforcement further includes two end portions and an intermediate portion located between the end portions, with both end portions being fixed to the vehicle body via the first reinforcement. At least a portion of the inner wall disposed in the intermediate portion being caved in to gradually approach toward the first outer wall from the both end portions.

The bumper apparatus can also be provided with one or more side members disposed between the second reinforcement and the vehicle body. The first reinforcement can be defined by one or more hollow members having a second top wall and a second bottom wall which are welded to the first top wall and the first bottom wall of the second reinforcement, respectively. In addition, the first reinforcement can be configured to have a center wall disposed between the second top wall and the second bottom wall, and a second outer wall positioned to oppose and contact the inner wall of the second reinforcement.

The inner wall of the second reinforcement can be provided with a first groove whose cross section is U-shaped at the intermediate portion, with the first groove being gradually deepened from the side of the one of the end portions to the center of the intermediate portion. Also, the first outer wall can be provided with a second groove whose cross section is U-shaped at each of the end portions, with the second groove being gradually deepened from the center of the intermediate portion toward the outside in the vehicle width-wise direction.

The bumper apparatus of the present invention provided with the bumper reinforcement is advantageous in that its thickness in the vehicle longitudinal direction at both ends is larger than in the center portion thereof. In addition, the inner wall of the intermediate portion is strengthened by having the portion that is caved in gradually toward the outer wall. Therefore the bumper apparatus can obtain a sufficient capacity to resist an impact load, thereby increasing its capacity to absorb the energy generated by a vehicle collision.

According to another aspect of the invention, a bumper apparatus for a vehicle includes a first reinforcement and a second reinforcement connected to the first reinforcement and extending in a width-wise direction of the vehicle. The second reinforcement includes an outer wall at a side remote from the vehicle body, an inner wall at a side near the vehicle body, and a first top wall and a first bottom wall connecting the first outer wall with the inner wall. The second reinforcement further includes an intermediate portion located between two end portions with respect to the width-wise direction of the vehicle, with each of the end portions being fixed to the vehicle body via the first reinforcement. The inner wall is provided with a U-shaped groove having a depth that varies along the width-wise direction of the second reinforcement.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
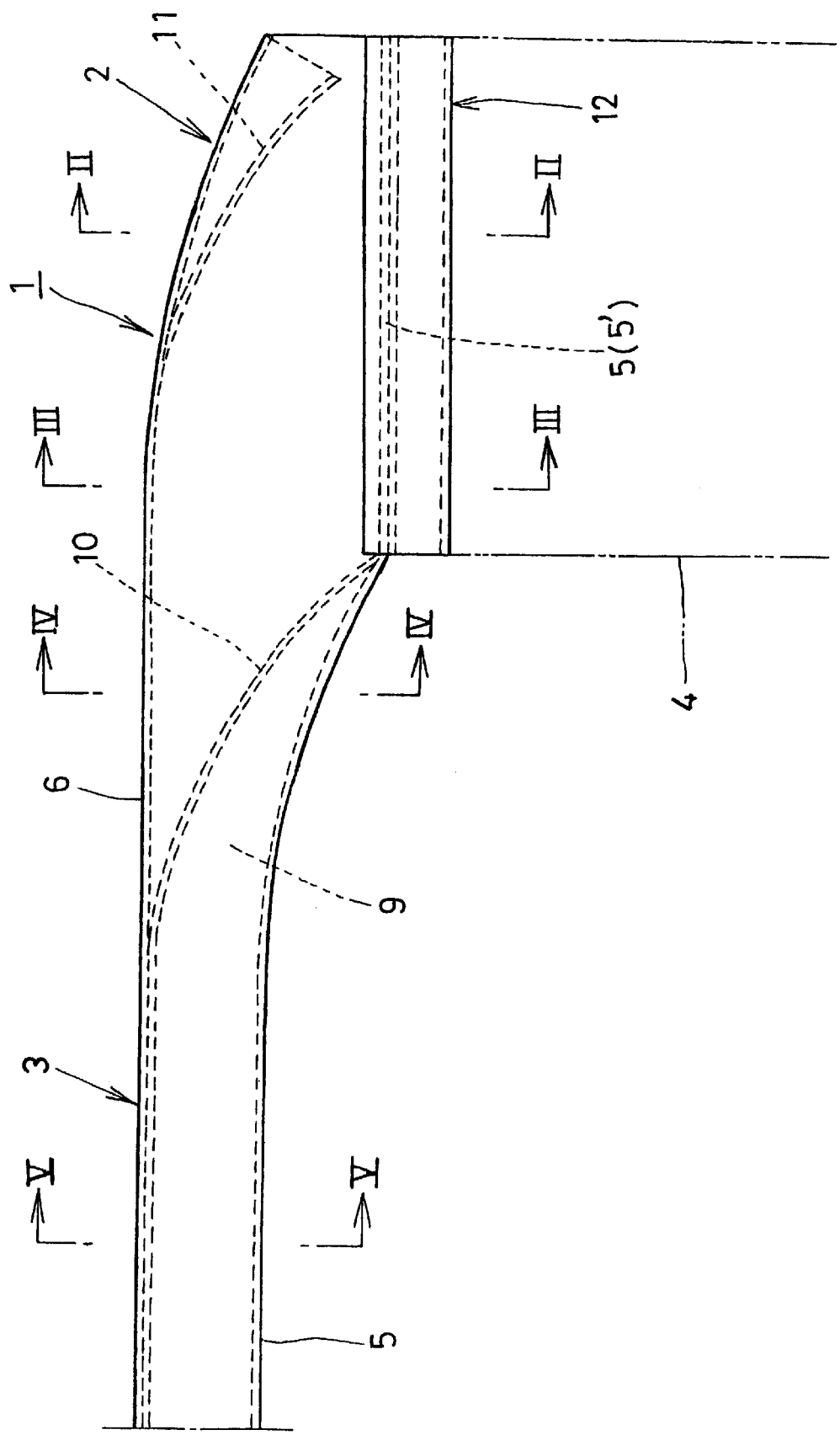
FIG. 1 is a plan view of a right side portion of a bumper apparatus in accordance with the present invention.

A bumper reinforcement forming a bumper apparatus of the present invention is shown in FIG. 1. It is to be noted that FIG. 1 only illustrates the right half of the bumper apparatus, it being understood that the left half is the same as and symmetrical to the illustrated right half.

Figure 2:
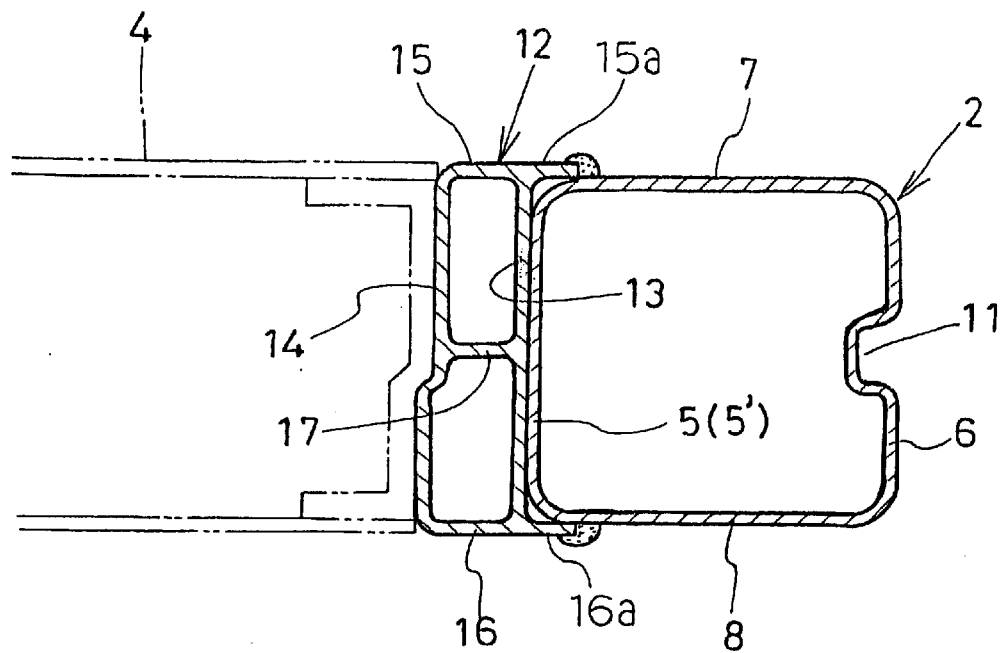
FIG. 2 is a cross-sectional view of the bumper apparatus taken along the section line II—II in FIG. 1.
Figure 3:
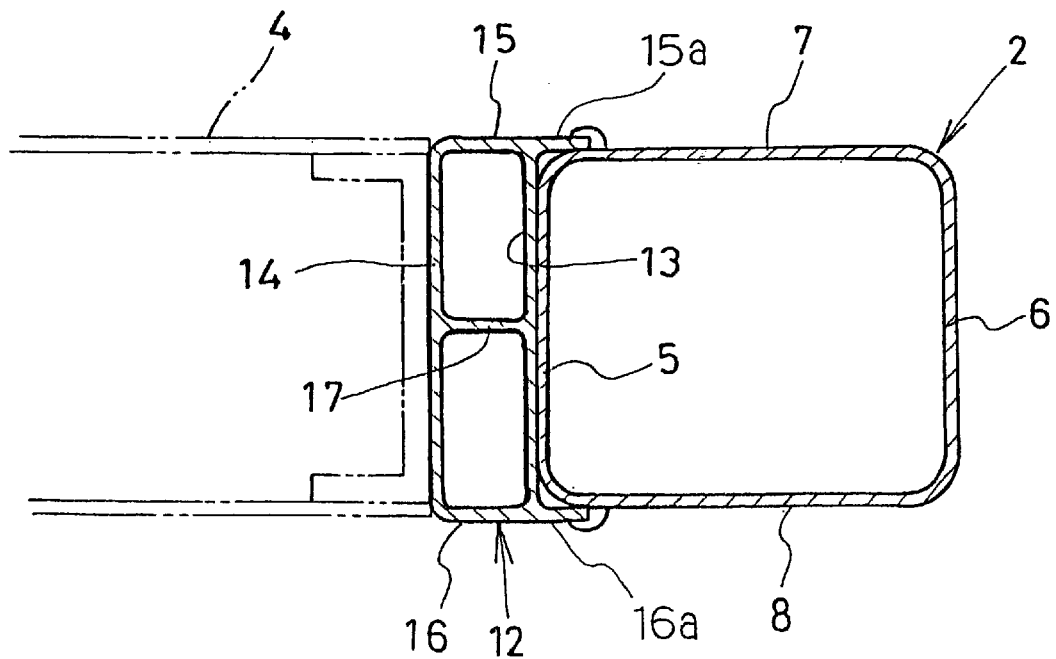
FIG. 3 is a cross-sectional view of the bumper apparatus taken along the section line III—III in FIG. 1.

The bumper reinforcement 1 is a hollow bumper reinforcement formed by extruding steel or aluminum alloy. The bumper reinforcement 1 extends in the vehicle width-wise direction and includes opposite end portions 2 and an intermediate portion 3 disposed between the end portions 2. As shown in FIGS. 2 and 3, the end portions 2 include a flat surface 5' extending along an outer wall 13 of a reinforcing member 12, and have a rectangular cross section. The flat surface 5' is a part of an inner wall 5 of the bumper reinforcement 1. The rectangular cross section is defined by an outer wall 6 opposed to the inner wall 5, an upper wall 7 and a lower wall 8.

Figure 4:
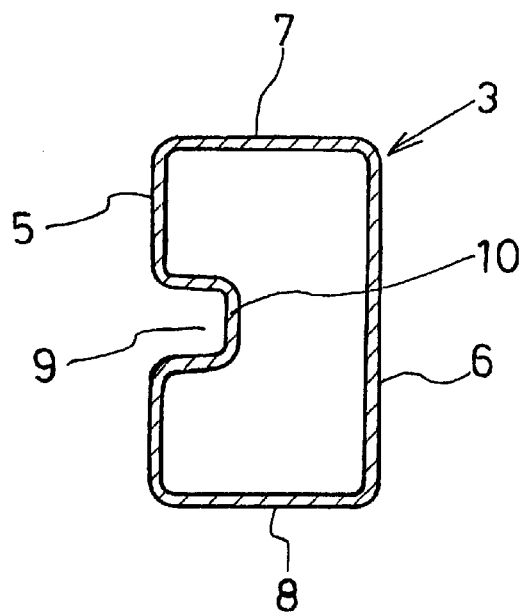
FIG. 4 is a cross-sectional view of the bumper apparatus taken along the section line IV—IV in FIG. 1.
Figure 5:
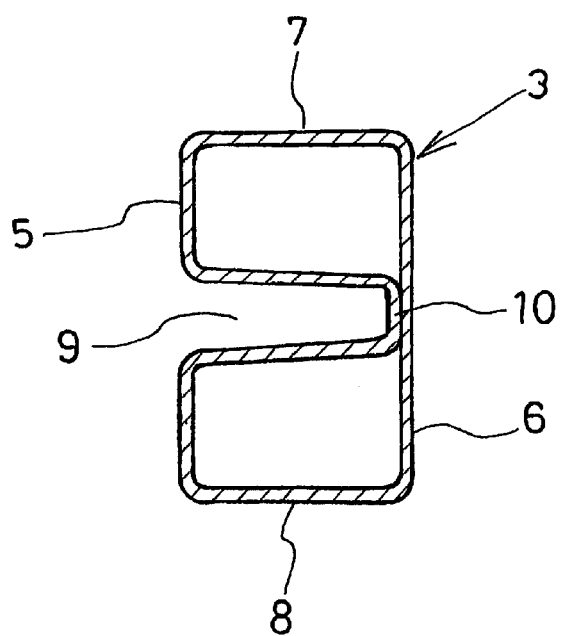
FIG. 5 is a cross-sectional view of the bumper apparatus taken along the section line V—V in FIG. 1.

The width of the flat surface 5' approximately equals the width of the reinforcing member 12. As shown in FIGS. 1, 4 and 5, the inner wall 5 is caved in so that the inner wall 5 includes a first groove 9. The first groove 9 extends from the inside ends of the reinforcing member 12 to the center of the bumper reinforcement 1, and has a U-shaped cross section. The bottom surface 10 of the first groove 9 gradually deepens (i.e., the depth of the groove 9 gradually increases) from the reinforcing member 12 side to the intermediate portion 3, and is brought into abutment with the inside of the outer wall 6 as shown in FIG. 5.

As shown in the drawing figures, the inner wall 5 approaches the outer wall 6 so that the thickness of the intermediate portion 3 in the longitudinal direction of the vehicle body is reduced when compared to the dimension of the end portions 2 in the same direction. With the above-described shape of the intermediate portion 3, a sufficient space is obtained between the radiator (not shown) of the vehicle engine in the vehicle body and the bumper reinforcement 1. A sufficient space is also obtained in a rear bumper if the above shape is applied to the bumper reinforcement of the rear bumper.

In addition, the opposing walls which constitute or form the first groove 9 are adapted to deform to absorb an impact upon vehicle collision. The deformation of the opposing walls helps ensure that the bumper reinforcement possesses a sufficient capacity to absorb an impact load relative to a displacement of the deformation, thereby restraining the transmission of the load to the vehicle body upon vehicle collision.

As shown in FIG. 2, a second groove 11 is formed in the outer wall 6. The second groove 11 gradually deepens (i.e., the depth of the second groove gradually increases) toward the outside of the end portion 2. The second groove 11 is effective to make each of the end portions 2 curved or rounded. The outer profile of the bumper reinforcement 1 can be appropriately determined by adjusting or choosing the position and depth of the second groove 11.

Though the bumper reinforcement shown in FIGS. 1 and 2 has one first groove 9 formed in the inner wall 5 and one second groove 11 formed in the outer wall 6, a plurality of first grooves 9 and a plurality of second grooves 11 can be formed on the bumper reinforcement 1.

The first groove 9 and the second groove 11 are formed by pressing the outer and inner walls of a hollow member with a jig possessing a predetermined shape. With this pressing of the hollow member, the outside of the hollow member is preferably wrapped or held with a die to prevent excessive bulging.

The reinforcing member 12, which constitutes a part of the bumper apparatus of this invention, is in the form of an extruded hollow member which is identical or superior to the bumper reinforcement 1 in raw material strength. The length of the reinforcing member 12 in the vehicle width-wise direction is approximately equal to lengths of both the flat surface 5' and the side member 4 in the vehicle width-wise direction. The depth in the vehicle longitudinal direction is determined depending on the type of vehicle.

The reinforcing member 12 includes the outer wall 13, the inner wall 14, upper and lower walls 15 and 16, and a center wall 17 as shown in FIG. 2. The upper wall 15 and the lower wall 16 possess respective extending portions 15a, 16a that overlap with portions of the upper and lower walls 7, 8 respectively of the bumper reinforcement. The extending portion 15a of the upper wall 15 is welded to the upper wall 7 of the bumper reinforcement while the extending portion 16a of the lower wall 16 is welded to the lower wall 8 of the bumper reinforcement. The upper and lower walls 15, 16 of the reinforcing member 12 are thus fixed in a united manner with the upper and lower walls 7, 8 respectively.

The inner wall 14 of the reinforcing member 12 is disposed to contact the end surface of the side member 4, and is fixed to the end of the side member 4 by bolts which pass through holes formed in the inner wall 14.

Figure 6:
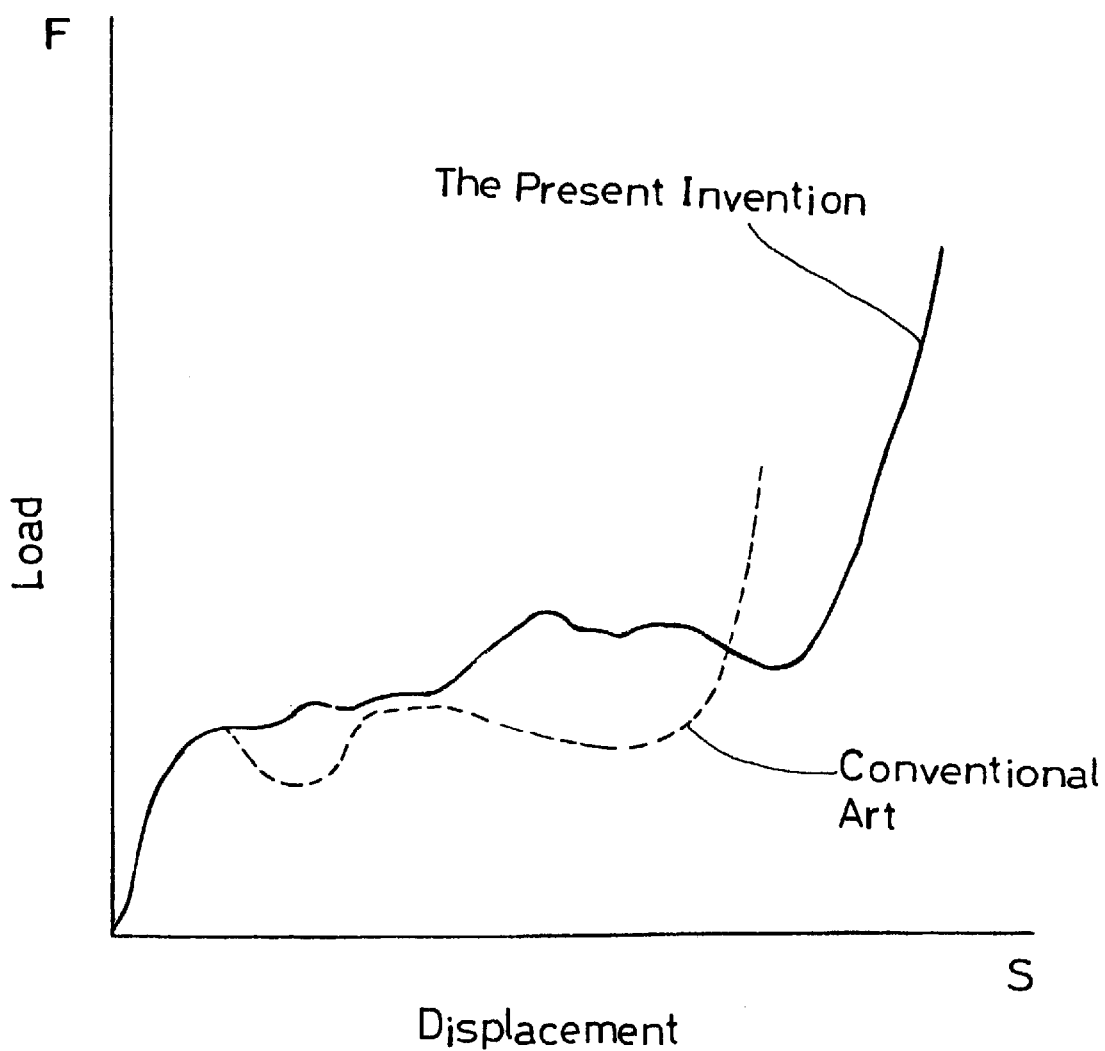
FIG. 6 is a graph showing the relationship between the impact load and deformation of the bumper reinforcement of the present invention and known bumper reinforcement.

The energy absorbing performance of the bumper reinforcement of the present invention can be seen with reference to FIG. 6. The dashed line in FIG. 6 shows the energy absorption of the known bumper reinforcement having a uniform cross-section in the span of the vehicle width.

In a first stage in which the impact load is applied, both the known bumper reinforcement and the bumper reinforcement of the present invention absorb energy generated by an impact upon vehicle collision, with the bumper reinforcement of the present invention being deformed substantially the same as the known bumper reinforcement. However, the bumper reinforcement of the present invention possesses high energy absorbing performance so that the bumper reinforcement is able to absorb the large impact load through deformation thereof. In a next stage, the reinforcing member is plastically deformed to receive a larger load so that the bumper reinforcement can absorb the energy generated by the impact. The absorbing performance of the known bumper reinforcement is low as compared to that of the bumper reinforcement of the present invention, with the known bumper reinforcement being crushed and losing energy absorbing performance earlier than that of the present invention.

As is apparent from FIG. 6, the reinforcing member 12 becomes plastically deformed following the plastic deformation of the bumper reinforcement 1 in the bumper apparatus of the present invention so that it is possible to improve the energy absorbing performance by combining the above deformations. In addition, the outer and inner walls of the reinforcing member face each other for receiving a large load with a large area defined by the inner wall of the reinforcing member and the ends of the side members. Therefore the impact load is not locally concentrated at each potion of the bumper reinforcement and the reinforcing member, but rather is uniformly transmitted from the bumper reinforcement to the side members, thereby preventing the side members partially deforming.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bumper apparatus for a vehicle comprising:
   a first reinforcement;
   a second reinforcement extending in a width-wise direction of the vehicle, the second reinforcement including a first outer wall at a side remote from the vehicle body, an inner wall at a side near the vehicle body, and a first top wall and a first bottom wall connecting the first outer wall with the inner wall;
   the second reinforcement further including two end portions and an intermediate portion located between the two end portions, the two end portions being fixed to the vehicle body via the first reinforcement; and
   at least a portion of the inner wall disposed in the intermediate portion being caved-in to gradually approach toward the first outer wall from both end portions.

2. The bumper apparatus for a vehicle according to claim 1, further comprising at least one side member disposed between the second reinforcement and the vehicle body.

3. The bumper apparatus for a vehicle according to claim 1, wherein the first reinforcement includes at least one hollow member having a second top wall welded to the first top wall of the second reinforcement and a second bottom wall welded to the first bottom wall of the second reinforcement.

4. The bumper apparatus for a vehicle according to claim 3, wherein the first reinforcement has a center wall disposed between the second top wall and the second bottom wall, and a second outer wall opposing and contacting the inner wall of the second reinforcement.

5. The bumper apparatus for a vehicle according to claim 4, wherein the caved in portion of the inner wall of the second reinforcement forms a first groove possessing a U-shaped cross-section at the intermediate portion, the first groove gradually increasing in depth from a side of one of the end portions to the center of the intermediate portion.

6. The bumper apparatus for a vehicle according to claim 5, wherein the first outer wall has a second groove of U-shaped configuration at each of the end portions, the second groove gradually increasing in depth from a center r of the intermediate portion toward an outward direction with respect to the vehicle width-wise direction.

7. A bumper apparatus for a vehicle comprising:
   a first reinforcement;
   a second reinforcement connected to the first reinforcement and extending in a width-wise direction of the vehicle, the second reinforcement including an outer wall at a side remote from the vehicle body, an inner wall at a side near the vehicle body, and a first top wall and a first bottom wall connecting the first outer wall with the inner wall;
   the second reinforcement further including an intermediate portion located between two end portions with respect to the width-wise direction of the vehicle, each of the end portions being fixed to the vehicle body via the first reinforcement; and
   the inner wall being provided with a U-shaped groove having a depth that varies along the width-wise direction of the second reinforcement.

8. The bumper apparatus for a vehicle according to claim 7, wherein the depth of the U-shaped groove gradually increases in a direction towards a center of the intermediate portion.

9. The bumper apparatus for a vehicle according to claim 7, wherein each end of the second reinforcement is connected to a side member so that the side member is disposed between the end of the second reinforcement and the vehicle body.

10. The bumper apparatus for a vehicle according to claim 7, wherein the first reinforcement is a hollow member having a top wall and a bottom wall, and including an extending portion extending from the top wall of the first reinforcement and welded to the top wall of the second reinforcement, and an extending portion extending from the bottom wall of the first reinforcement and welded to the bottom wall of the second reinforcement.

11. The bumper apparatus for a vehicle according to claim 10, wherein the first reinforcement has a center wall disposed between the top wall and the bottom wall of the first reinforcement, the first reinforcement also including an outer wall contacting the inner wall of the second reinforcement.

12. The bumper apparatus for a vehicle according to claim 7, wherein the U-shaped groove gradually increases in depth from adjacent one of the end portions of the second reinforcement toward a center of the intermediate portion.

13. The bumper apparatus for a vehicle according to claim 7, wherein the outer wall of the second reinforcement is provided with a U-shaped groove extending over only a portion of the second reinforcement with respect to the width-wise direction.

14. The bumper apparatus for a vehicle according to claim 13, wherein the U-shaped groove in the outer wall of the second reinforcement gradually increases in depth in a direction outwardly with respect to the vehicle width-wise direction.

* * * * *

UNITED STATES PATENT AND TRADEMARK OFFICE
CERTIFICATE OF CORRECTION

PATENT NO.   : 6,467,831 B2
DATED        : October 22, 2002
INVENTOR(S)  : Kazuo Mori et al.

It is certified that error appears in the above-identified patent and that said Letters Patent is hereby corrected as shown below:

<u>Title page,</u>
Item [73] is corrected to read:
-- [73]   Assignee:   Aisin Seiki Kabushiki Kaisha, Kariya (JP)
                     Aisin Keikinzoku Kabushiki Kaisha, Shinminato (JP) --

Signed and Sealed this

Thirteenth Day of May, 2003

JAMES E. ROGAN
*Director of the United States Patent and Trademark Office*